United States Patent [19]

McNab

[11] Patent Number: 5,054,653

[45] Date of Patent: Oct. 8, 1991

[54] PNEUMATIC MATERIAL ALARM

[75] Inventor: John G. McNab, Hudson, Canada

[73] Assignee: Graves Spray Supply, Incorporated, Clearwater, Fla.

[21] Appl. No.: 519,154

[22] Filed: May 4, 1990

[51] Int. Cl.$^5$ .......................................... G01D 13/10
[52] U.S. Cl. .................................... 222/28; 222/31; 222/638; 116/4; 116/62.4; 116/292
[58] Field of Search ................... 222/25, 28, 31, 39, 222/55, 638, 148, 251, 333; 116/4, 62.4, 271, 292; 340/406

[56] References Cited

U.S. PATENT DOCUMENTS

| | | | |
|---|---|---|---|
| 2,175,129 | 10/1939 | Rolfson | 116/62.4 |
| 2,624,306 | 1/1953 | Hatke | 116/4 |
| 2,754,788 | 7/1956 | Sperry | 116/4 |
| 3,269,352 | 8/1966 | Van Winkle | 116/4 |
| 3,375,718 | 4/1968 | Robinson et al. | 116/271 X |
| 3,946,900 | 3/1976 | DuBrueler, Jr. | 222/25 X |
| 4,240,372 | 12/1980 | Davis | 116/271 |
| 4,407,431 | 10/1983 | Hutter, III | 222/148 X |
| 4,475,665 | 10/1984 | Norton | 222/25 X |

OTHER PUBLICATIONS

Venus Gusmer, "Materials Monitoring Systems", 6th Edition, 1989, p. 118.

Primary Examiner—Michael S. Huppert
Assistant Examiner—Gregory L. Huson
Attorney, Agent, or Firm—Barnes & Thornburg

[57] ABSTRACT

A system including a nonelectrical sensor for sensing the position of a needle of a gauge as it moves along a path and providing the sensed nonelectrical signal to a nonelectrical annunciator for annunciating when the needle is not at a predetermined position. The sensor is adjustably mounted with respect to the path of the needle by mounting the sensor to an adjustable transparent face plate of the gauge. A range portion is provided on a standard needle. A nonelectrical flush alarm includes a sensor to sense that the pump of a spraying or dispensing system is operating. If this sensor does not provide a signal to a timer for a preset period, the timer will produce a timed out signal which will be annunciated by an annunciator.

30 Claims, 2 Drawing Sheets

PNEUMATIC MATERIAL ALARM.3

BACKGROUND AND SUMMARY OF THE INVENTION

The present invention relates generally to monitors for gauges and more specifically to a nonelectrical monitor and alarm for use in hazardous environments.

The use of mechanical indicators such as gauges and another annunciators is well known. With the advent of relatively inexpensive integrated circuits, electrical gauges and alarms have replaced the mechanical gauges and indicators. In certain environments, the possibility of any sort of electrical spark is very hazardous. An example of one such environment is in the plastic and coating spraying industry where resin and catalysts are mixed together and sprayed onto a surface. There are many variables which must be monitored in the spraying environment. The spraying environment generally includes a series of mechanical gauges, operating on pressure, to indicate the pressures throughout the system as well as flow rates. The use of microprocessors and other forms of electrical equipment are used to interpret these electric signals to determine the flow and mass rate as well as the total amount of material being dispensed. Not only are these electrical systems somewhat expensive, but again they cannot be used in hazardous environments where any sort of electrical spark is considered dangerous. Also, electrical systems must met strict Underwriters and local codes and regulations.

One of the problem areas for which an alarm or monitor is very important is the flow rate of the catalyst. If the flow rate fluctuates, the resulting mixture will be over or under catalized and therefore produce a defective product or coating. Large variations in the flow rate would become obvious to the operator, but not in sufficient time to prevent forming an undesirable portion or layer and thus necessitate scrapping the whole product. Similarly small variations would not be obvious to the operator and could create areas or layers of undesirable composition which would fail in use.

Also, in internal mix guns where the catalyst is mixed with the resin, the mixture will set if the spraying operation is stopped for a period exceeding the set up time of the material. Normally at the termination of a job, the operator flushes the gun with a solvent. In some situations, the operator interrupts the spraying before finishing the job for a period longer than the set up time. This plugs the gun and cannot be remedied by flushing.

Thus, it is an object of the present invention to provide a nonelectrical alarm system for gauges which indicates when the signal being monitored by the gauge is out of an acceptable range.

Another object of the present invention is to provide a nonelectrical alarm system having a sensor which is capable of being used with any gauge and adjustable as to the value and range of the value to be monitored by the sensor.

A still even further object of the present invention is to provide an alarm or monitoring system for indicating to the operator to flush the system.

These and other objects of the invention are achieved by positioning a nonelectrical sensor to sense the position of a needle of a gauge as it moves along a path and providing the sensed nonelectrical signal to a nonelectrical annunciator for annunciating when the needle is not at a predetermined position. The sensor is adjustably mounted with respect to the path of the needle. This is achieved by mounting the sensor to a transparent face plate of the gauge, unsecuring the face plate and adjusting the face plate to position the sensor at the desired position on the gauge and then resecuring the face plate. If the path of the needle is a portion of a circle, and the face plate and the recess, in which it is mounted, are circular, their centers are all coaxial.

A range portion is provided on a standard needle and the sensor is positioned to sense the position of the range portion. The range portion has a length along the path which defines the range or sensitivity of the alarm. The range portion of the needle may be adjusted in itself or may be replaced with various length range portions. The gauge, the sensor and the annunciator are preferably pneumatic.

Although this system will be described for plastic and coating spraying systems, it may be used with any gauge having a needle, in a hazardous or non-hazardous environment, and for any material dispensing system.

A nonelectrical flush alarm or monitor may also be provided. The flush alarm includes a sensor to sense that the pump of a spraying or dispensing system is operating. If this sensor does not provide a signal to a timer for a preset period, the timer will produce a timed out signal which will be annunciated by an annunciator. The preset period of the timer is the set time of the plastic material. The sensor senses the mechanical movement of the pump which is actuated during spraying or dispensing. The sensor, timer and annunciator are preferably pneumatic.

The flush alarm and the gauge monitoring alarm may be provided in a single housing with separate and distinct annunciators as well as a common annunciator. The common annunciator may be an audible annunciator warning the operator that there is a problem. Then the operator consults one of the individual annunciators, which preferably are visual annunciators, indicating the problem to be addressed. This may be either that the gauge is reading a value outside the desired range or that the spraying or dispensing process has been interrupted for a period which exceeds the set time of the material. The flush alarm is most desirable with internal mix guns wherein the catalyst and resin are mixed internal to the gun and therefore will set in the gun if not flushed.

Other objects, advantages and novel features of the present invention will become apparent from the following detailed description of the invention when considered in conjunction with the accompanying drawings.

DETAILED DESCRIPTION OF THE DRAWINGS

Figure 1:
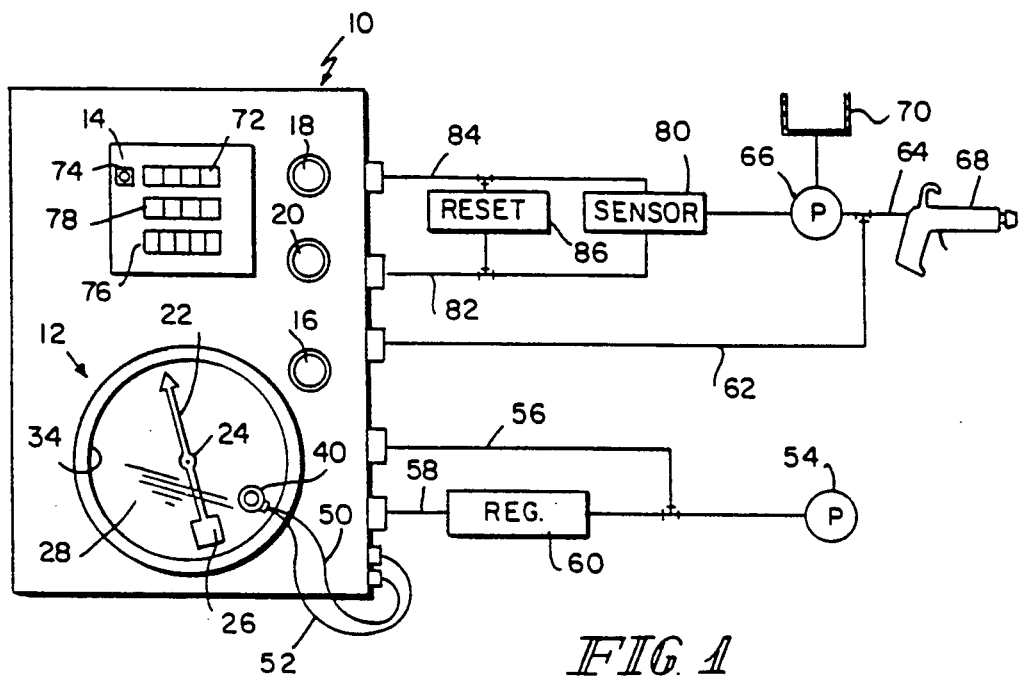
FIG. 1 is a diagrammatic view of a sensor and alarm system according to the principles of the present invention.
Figure 2:
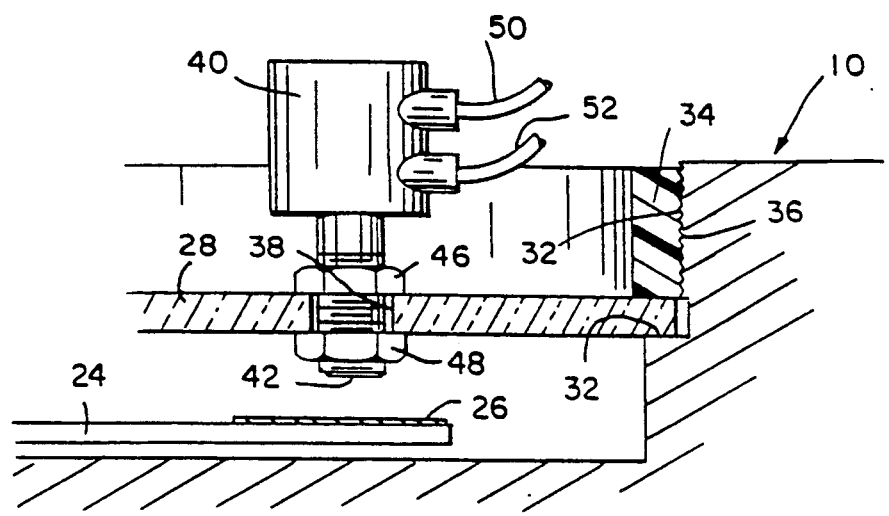
FIG. 2 is a cross-sectional blow up of the sensor and gauge of FIG. 1.

An alarm and monitor system having a housing 10 as illustrated in FIG. 1 includes a mechanical pressure gauge 12 and a timer 14. Annunciators 16, 18 and 20 are also provided. As illustrated in FIGS. 1 and 2, the gauge 12 includes a needle 22 which pivots about point 24.

A range or sensitivity portion 26 is mounted on the end of the needle 22. The length of the range portion 26 along the path of rotation of the needle 22 defines the range or sensitivity of the alarm or monitoring system. For example, if a quarter of an inch of circumferal travel of the meter represents 10 psi, a one inch length of range portion 26 would represent a 40 psi range or sensitivity of the monitoring system.

The range portion 26 may be secured to the needle 22 by any known means, for example gluing, welding or bonding. The process of mounting may be permanent or may be removable such that the range may be changed. Alternatively, the range defining portion 26 may itself be adjustable being formed of two telescopic pieces which may be locked in a desired adjusted length.

The gauge 12 includes a transparent face plate 28 or lens which is received in a circumferal recess 30 of the meter 12. The circumferal recess 30 includes an inner threaded portion 32 which is complementary to and mates with an exterior threaded portion 36 of a lock and ring 34. The lock ring 34 secures the face plate 28 within the recess 30.

As illustrated in detail in FIG. 2, a sensor 40 is mounted in an aperture 38 in the face plate 28 by fasteners illustrated as nuts 46, 48. The distal end 42 of the sensor 40 is adjacent the path of the needle 24 and the range portion 26. The sensor 40 is a pneumatic sensor and includes pneumatic lines 50, 52 which respectively bring a source of air and returns a source of air to the monitor and alarm housing 10.

When the range portion 26 is adjacent the distal end 42 of the sensor 40, the air emitted by the sensor is returned and transmitted back to the alarm and monitoring system. When the range defining portion 26 is not below the distal end 42 of the sensor 40, the air signal emitted from the end 42 is not returned to the alarm and sensor system. Thus the sensor 40 will determine when the needle is at a given position defined by the position of the sensor 40 and the length of the range portion 26.

The lock ring 34 allows adjustment of the position of the sensor 40. By rotating the lock ring 34 so as to unlock the face plate 28, the face plate 28 may be rotated about its center which is coaxial with the center of the pivot point 24 of the needle to a new desired position for the sensor 40 along the face of the gauge 12. Once this desired position is reached, the lock ring 34 is then rotated to lock the face plate 28 in the recess 30 and the sensor 40 at the desired position.

By mounting the sensor 40 in the face plate 28, the sensor system is not dedicated to any particular gauge. It may be mounted to any gauge having a face plate. Also, by mounting the sensor to the face plate, the position of the sensor may be readily adjustable by merely loosening the securing element for the face plate and rotating the face plate along its predefined path. This removes any errors which result since the face plate and the recess, in which it is located, have a center coaxial with the center of rotation of the needle 22.

A compressor 54 providing a source of high pressure air for the pneumatic system is provided to the monitor and alarm housing 10 directly by line 56 and a low pressure at line 58 via a regulator 60. The regulated or low pressure source on line 58 is used in the sensing system. This provides faster response, in the 20 millisecond range, as compared to using a higher pressure. The logic elements which are capable of operating at the high pressure are connected to the line 56.

The input for the gauge 12 is via line 62 from the system represented by line 64 between a pump 66 and a spraying gun 68. The pressure signal on line 62 represents the pressure or flow rate of the material from the pump 66 to the gun 68. A source of material 70 is shown connected to the pump 66. Once the needle 24 is out of the range of the sensor 40, the alarm logic activates annunciator 16 to provide a visual indication that a fluid delivery system's parameters are not within the desired range. Annunciator 20 may be an audible annunciator, for example a whistle, which is also activated by the out of range alarm signal. Thus the user of the spraying equipment would hear an audible alarm to indicate that the material being sprayed does not have the appropriate mixture as measured by the pressure or flow rate of one of the materials for example, the catalyst.

If the spraying system is an internal mix gun, wherein the components for the plastic are internally mixed, it is very desirable to have an indication that the spraying process has stopped for a predetermined amount of time and that the internally mixed plastic and catalyst may set up within the gun. This is very damaging to the gun and the guns must be flushed when the system is shut off. To provide an indication that the spraying operation has terminated for a longer period of time than the set time, the present monitor and alarm system provides an indication via a visual indicator 18 and the common audible indicator 20. When the operator hears the audible alarm and checks to see that the visual indicator 18 is annunciated, they flush the gun with a solvent to remove the components and thereby prevent them from setting up within the gun.

The counter 18 is a pneumatic counter and includes a display 72 of the elapsed time since the spraying process has stopped. A reset button 74 for the timer is provided on the face of the timer 14. The value of timing out of the timer is set by buttons 76 and displayed in a permanent display 78.

The determination of the operation of the spraying system is determined by sensor 80 which senses the operation of the pump 66. Sensor 80 is a pneumatic switch with a mechanical input to monitor the mechanical movement of the pump 66. The sensor 80 is connected to the monitor and alarm system via input air line 82 and output air line 84. A remote pneumatic reset switch 86 is connected in parallel with the sensor 80.

As the pump 66 continues to operate, the sensor 88 provides a signal back on line 84 to the housing 10 resetting the timer 72. If the mechanical movement of the pump stops for a period of time greater than the preset time of the timer, the timer will time out and activate the annunciators 18, 20. If the pump 66 should stop for any reason and then restart, the timer 14 will be reset as long as it has not timed out. The time preset for timer 14 should be less than the set time of the material being dispensed such that once the alarm is activated the system can be flushed to prevent the material from setting up within the gun.

Figure 3:
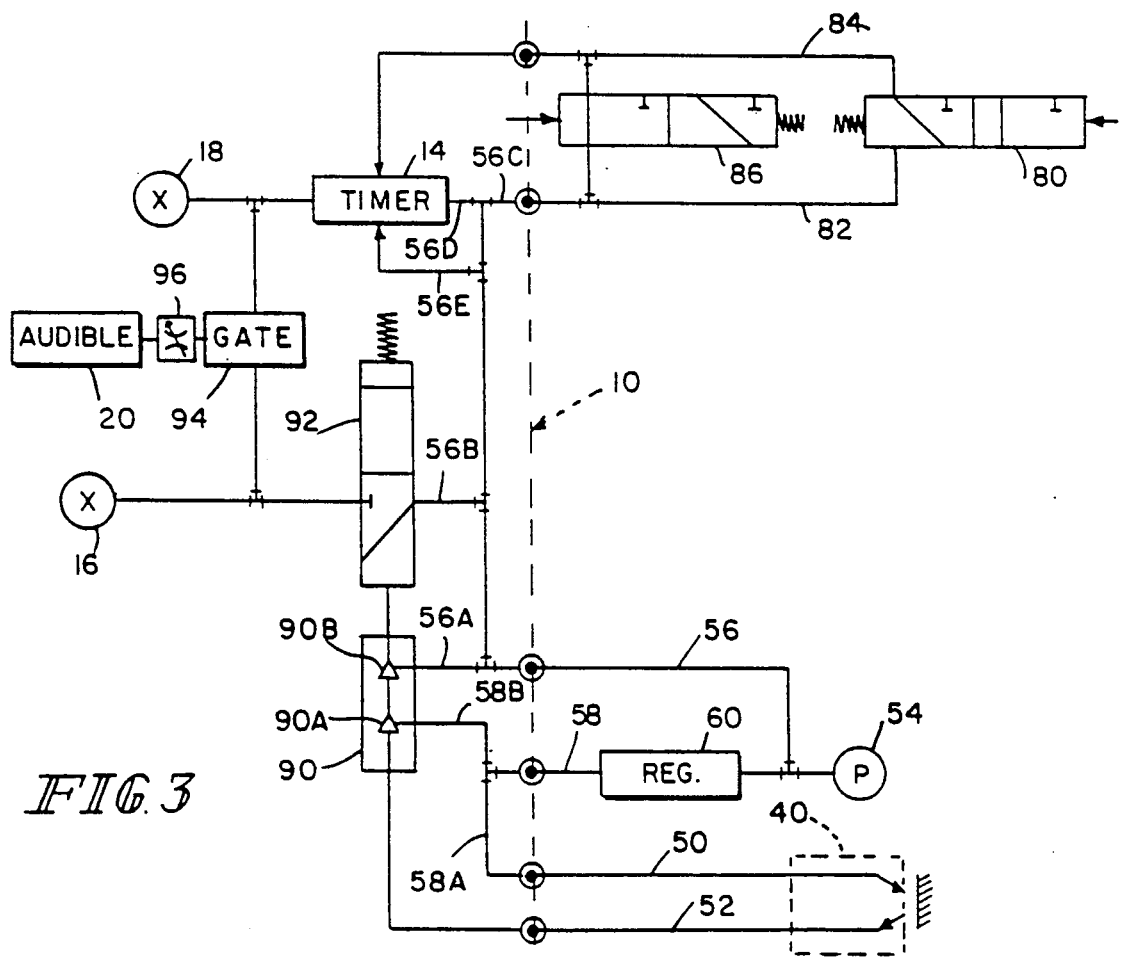
FIG. 3 is a schematic of the monitoring alarm system of the present invention.

An example of a pneumatic system which will provide the monitor and alarm functions described above is illustrated in FIG. 3. The elements left of the dotted line are those within the housing 10 and the elements to the right are those exterior to the housing 10. The interior lines which connect the high pressure signal 56 include the number 56 and an appropriate letter and the low pressure signal from line 58 includes the number 58 and an appropriate letter. The low pressure signal 58 is provided by line 58A to line 50 as the input to sensor 40 and over line 58B as a pilot input to the first amplifier 90A in a dual pneumatic amplifier 90.

The output of sensor 40 over line 52 is connected to the input of the amplifier 90. The second amplifier 90B has its pilot input connected to line 56A of the high pressure source 56. Thus the low pressure signal 52 from the sensor 40 is amplified to a proportional high pressure signal that provides a control input to a two position valve 92. The high pressure line 56B is connected as a pressure source input to valve 92.

The output of valve 92 is provided to the visual annunciator 16 and to a pneumatic gate 94. A spring biases the valve 92 to its on position conducting the high pressure flow from line 56B to the annunciator 16 and the gate 94. Upon receipt of a feedback signal over line 52 through amplifier 90, the valve 92 moves to its off position disconnecting line 56B to the annunciator 16 and the gate 94. The output of gate 94 is provided through a variable restriction 96 to an audible alarm 20 which may be for example, a whistle.

As previously discussed, the annunciators 16, 18 are pneumatic visual annunciators. A typical mechanical annunciator for annunciators 16, 18 would be model OH-22 available from Festo Pneumatic. The gate 94 provides the highest of two input signals to its output. One of the inputs described so far for gate 94 is the common input to annunciator 16 for the gauge alarm. The second input is the common input to annunciator 18 for the flush alarm. Thus the annunciator 20 is a common annunciator which is activated when either of the annunciators 16 or 18 are activated. The annunciators 16, 18 are only activated for their alarm signals.

The flush alarm is connected to high pressure line 56 and providing a high pressure output signal 56C to the sensor 80 and the remote reset 86, both illustrated as two position valves. The return line 84 from the valves 80, 86 are provided as a pilot input to timer 14 to be compared against the high pressure pilot input 56E. The high pressure input signal 56D is provided at the output of timer 14 once the timer 14 has timed out. This high pressure signal is provided to annunciator 18 and to annunciator 20 via gate 94.

The valve 80 is spring biased to its off or disconnected condition and is biased to its on or connected position interconnecting lines 82 and 84 in response to the operation of the movement of the pump 66. The pump 66 generally used in the spraying industry has a mechanical movement which can be used to move the valve 80 during a given portion of its cycle. As long as valve 80 moves from its shown off position to its on position before the expiration of the time period set for the timer 14, the timer 14 will be reset.

The remote reset valve 86 is also a two position valve which is normally biased by a spring to its off or disconnected position. Upon the input of a manual signal the valve 86 will be moved to its on position providing a feedback signal to timer 14 to reset it. It should be noted that remoted reset valve 86 can only reset the timer 14 if it has not timed out. The timer 14, after it has timed out, can only be reset by button 74 on the face of the timer at monitor and alarm housing 10. Pneumatic timer 14 may be model PZ-VT-999 also available from Festo Pneumatic.

Although the present system is shown as including a flush timer as well as an alarm for a meter for the catalyst for a spray system, the present systems may be provided individually. Similarly, the gauge monitor and alarm may be provided for any gauge in any environment for any dispensing of material.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A non-electrical gauge alarm comprising:
   a gauge having a needle movable along a path in response to an input;
   a non-electric sensor means for sensing a predetermined position of said needle;
   adjustment means for variably adjusting a mounting of said sensor means relative to said path of said needle to determine said predetermined position; and
   annunciator means for annunciating when said needle is not at said predetermined position as sensed by said sensor means.

2. An alarm according to claim 1, wherein said sensor means and said annunciator means are pneumatic.

3. An alarm according to claim 1, wherein said needle includes a range portion whose length along said path defines a range of predetermined positions and said sensor means is positioned to sense said range portion.

4. An alarm according to claim 3, wherein said range portion is adjustable in length to vary the range of predetermined positions.

5. An alarm according to claim 1, wherein:
   said gauge includes a transparent face plate mounted to a gauge housing;
   said sensor means is mounted to said face plate; and
   said adjustment means adjustably mounts said face plate to said housing to adjust the position of said sensor means.

6. An alarm according to claim 5, wherein said sensor means is pneumatic and is mounted in an orifice in said face plate.

7. An alarm according to claim 5, wherein:
   said housing includes a recess receiving said face plate; and
   said adjustment means secures said face plate fixed in said recess at said predetermined position and unsecures said face plate to allow adjustment to a new predetermined position before resecuring said face plate in said recess.

8. An alarm according to claim 7, wherein said recess and said adjustment means include and engage at complementary threaded portions.

9. An alarm according to claim 7, wherein said path is a portion of a circle; and said recess and said face plate are circular and have a center coaxial with the center of said path.

10. A non-electrical material alarm comprising:
    a gauge having a needle movable along a path in response to an input indicating material flow rate from a dispensing system;
    first non-electric sensor means for sensing a predetermined position of said needle;
    adjustment means for variably adjusting a mounting of said first sensor means relative to said path of said needle to determine said predetermined position; and
    first annunciator means for annunciating when said needle is not at said predetermined position as sensed by said first sensor means.

11. An alarm according to claim 10, wherein said first sensor means and said first annunciator means are pneumatic.

12. An alarm according to claim 10, wherein:
said gauge includes a face plate mounted to a gauge housing;
said first sensor means is mounted to said face plate; and
said adjustment means adjustably mounts said face plate to said housing to adjust the position of said first sensor means.

13. An alarm according to claim 10, wherein said needle includes a range portion whose length along said path defines a range of predetermined positions and said first sensor means is positioned to sense said range portion.

14. An alarm according to claim 13, wherein said range portion is adjustable in length to vary the range of predetermined positions.

15. An alarm according to claim 10, including:
second sensor for sensing that material is being dispensed by said dispensing system;
timer means for providing a timed-out signal when a predetermined period of time has expired since said dispensing system has stopped dispensing material as sensed by said second sensor means; and
second annunciator means for annunciating said timed-out signal.

16. An alarm according to claim 15, wherein said second sensor means senses mechanical motion of a pump of said dispensing system.

17. An alarm according to claim 15, wherein said first and second sensor means, said timer means and said first and second annunciator means are pneumatic.

18. An alarm according to claim 15, wherein said second sensor means resets said timer means for any sensed dispensing before said timer means provides said timed-out signal.

19. An alarm according to claim 15, wherein said predetermined period of said timer means is set to the set time of the material being dispensed.

20. A non-electrical material alarm comprising:
a gauge having a needle movable along a path in response to an input of material flow rate of a dispensing system;
first non-electric sensor means for sensing a predetermined position of said needle;
second sensor means for sensing that material is being dispensed by said dispensing system;
timer means for providing a timed-out signal when a predetermined period of time has expired since said dispensing system has stopped dispensing material as sensed by said second sensor means; and
first annunciator means for annunciating when said needle is not at said predetermined position as sensed by said first sensor means or occurrence of said timed-out signal.

21. An alarm according to claim 20, wherein said second sensor means senses mechanical motion of a pump of said dispensing system.

22. An alarm according to claim 20, wherein said first and second sensor means, said timer means and said first annunciator means are pneumatic.

23. An alarm according to claim 20, including:
second annunciator means for only annunciating when said needle is not at said predetermined position as sensed by said first sensor means; and
third annunciator means for only annunciating said timed-out signal.

24. An alarm according to claim 23, wherein said first and second sensor means, said timer means and said first, second and third annunciator means are pneumatic.

25. An alarm according to claim 23, wherein said first annunciator means is audible and said second and third annunciator means are visual.

26. A non-electrical flush alarm comprising:
a non-electric sensor means for sensing that material is being dispensed by a dispensing system;
non-electric timer means for providing a timed-out signal when a predetermined period of time has expired since said dispensing system has stopped dispensing material as sensed by said sensor means; and
annunciator means for annunciating said timed-out signal.

27. An alarm according to claim 26, wherein said sensor means senses mechanical motion of a pump of said dispensing system.

28. An alarm according to claim 26, wherein said sensor means, said timer means and said annunciator means are pneumatic.

29. An alarm according to claim 26, wherein said sensor means resets said timer means for any sensed dispensing of material before said timer means provides said timed-out signal.

30. An alarm according to claim 26, wherein said predetermined period of said timer means is set in response to the material being dispensed.

* * * * *